Figure 3:
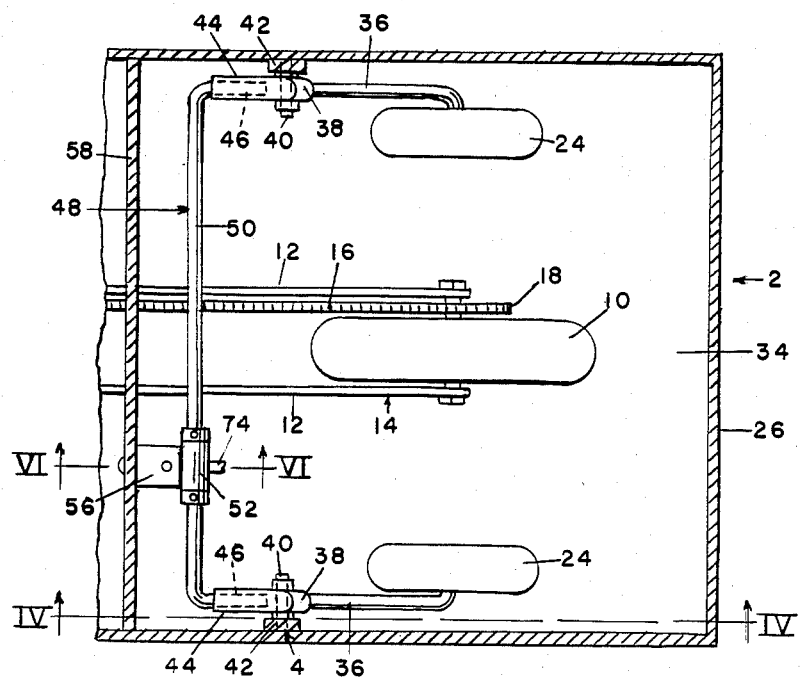

United States Patent [19]

Archer

[11] Patent Number: 4,513,837

[45] Date of Patent: Apr. 30, 1985

[54] MOTORCYCLE WITH OUTRIGGER WHEELS

[76] Inventor: Farley J. Archer, 508 Ida, Lansing, Kans. 66043

[21] Appl. No.: 516,919

[22] Filed: Jul. 25, 1983

[51] Int. Cl.³ .............................................. B62D 61/12
[52] U.S. Cl. .................................... 180/209; 280/293; 280/43.23
[58] Field of Search ............... 180/209; 280/293, 282, 280/43.17, 43.18, 43.19, 43.23

[56] References Cited

U.S. PATENT DOCUMENTS

| | | | |
|---|---|---|---|
| 1,358,252 | 11/1920 | Schneider | 180/219 X |
| 2,589,023 | 3/1952 | Pattner | 180/209 X |
| 2,960,351 | 11/1960 | Jeffress | 280/293 |
| 3,075,789 | 1/1963 | Hott | 280/43.17 |
| 3,980,150 | 9/1976 | Gigli | 280/293 X |

Primary Examiner—Joseph F. Peters, Jr.
Assistant Examiner—Charles R. Watts
Attorney, Agent, or Firm—John A. Hamilton

[57] ABSTRACT

A motorcycle having in-line front and rear wheels, and a pair of outrigger wheels spaced laterally apart at opposite sides of the rear wheel. The outrigger wheels may be extended downwardly to engage the roadway to provide lateral support against overturning, or retracted upwardly when their use is not desired. When extended, they are yieldable upwardly to permit leaning of the vehicle in turns. A control system permits selective use of a first operational mode in which the outrigger wheels are automatically retracted only at vehicle speeds above a pre-set level, a second mode in which the wheels remain extended at all speeds, and a third mode in which the wheels are retracted at all speeds.

7 Claims, 8 Drawing Figures

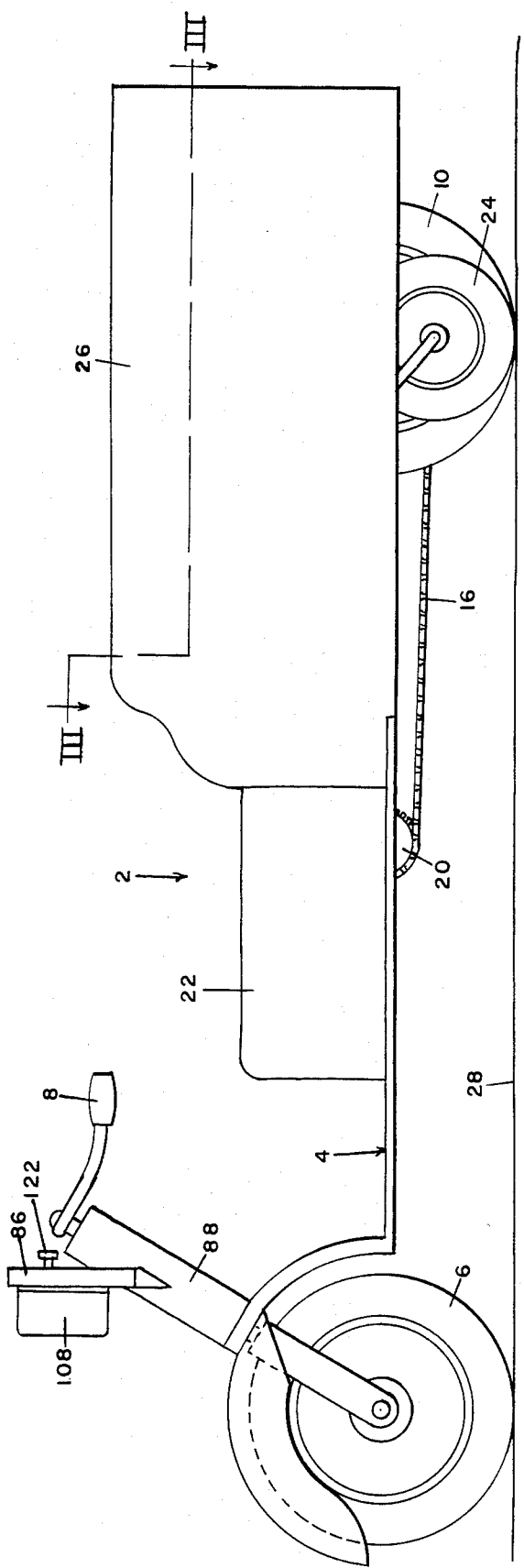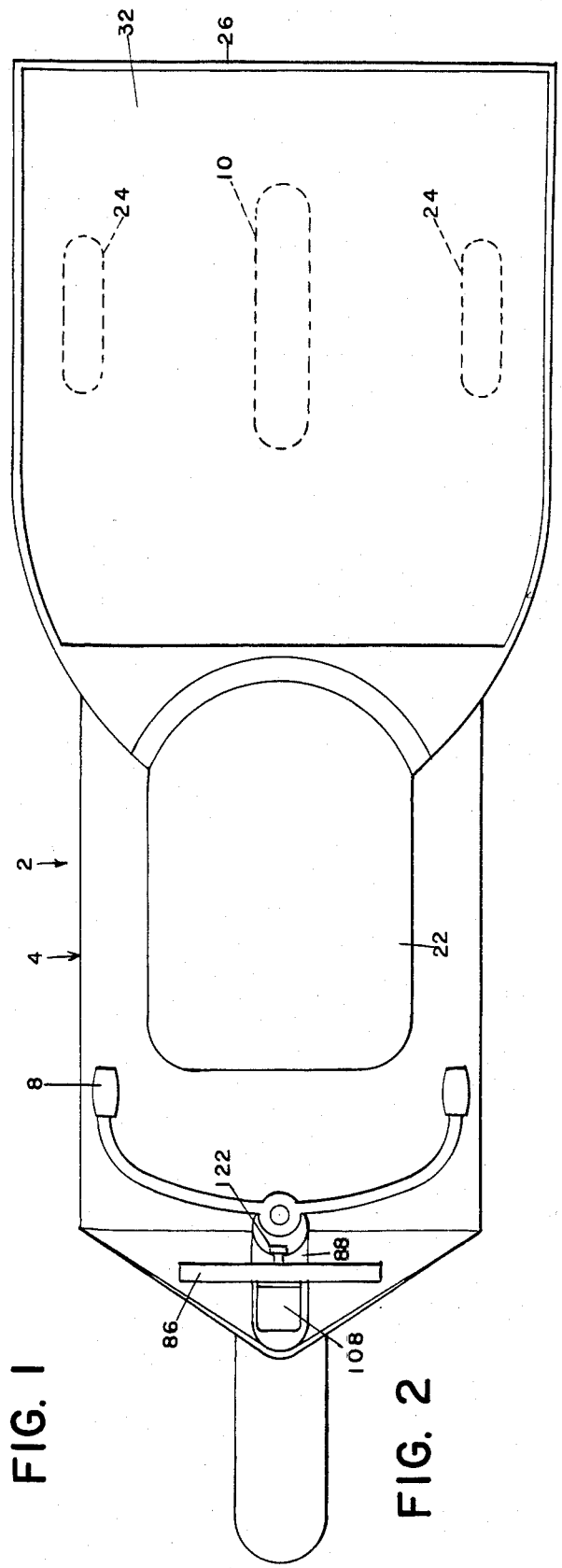

MOTORCYCLE WITH OUTRIGGER WHEELS

This invention relates to new and useful improvements in motorcycles, and has particular reference to a motorcycle having means operable to stabilize it against lateral overturning when stopped or moving at low speeds, or when moving on wet or otherwise slippery roadways.

Many persons of course ride motorcycles, and the popularity of the vehicle appears to be growing rapidly. However, while one of their attractions is the "thrill," or sense of freedom of movement, which is supplied by riding on two wheels disposed in front and rear in-line arrangement, as is standard in motorcycles, this same wheel arrangement may under some circumstances cause danger and concern, in connection with the possible lateral overturning of a two-wheeled vehicle. This danger and concern occurs especially when parked or moving at low speeds, as in stop-and-go traffic, and on wet or slick pavements, and even more particularly when the motorcycle is carrying a passenger in addition to the driver. The passenger may be inexperienced in motorcycle riding, and under emergency or unexpected conditions may "panic" and make the wrong moves, such as "leaning the wrong way". Since the passenger must ordinarily put his arms around the driver for support, wrong moves on his part may in turn upset the driver or cause him to move incorrectly, so that together they may destroy the normal lateral balance of the vehicle, and overturn.

Accordingly, the primary object of the present invention is the provision of means operable to stabilize the motorcycle against lateral overturning in all such dangerous conditions, such as when stopping, or moving at low speeds or on slick roadways, while at the same time permitting the added pleasure of "two wheeled" riding on dry pavement at higher speeds. Generally, this object is accomplished by the provision of two outrigger wheels disposed in laterally outwardly spaced relation at opposite sides of the rear drive wheel of the cycle, and means for extending said outrigger wheels downwardly to engage the roadway under dangerous conditions, or whenever desired, in order to stabilize the vehicle against lateral overturning, or retracting them upwardly well above the roadway under safer conditions, or when their use is not desired.

Another object is the provision of a system of the character described in which the outrigger wheels, when extended, engage the roadway with insufficient pressure to materially detract from the traction of the cycle drive wheel.

A still further object is the provision of a system of the character described in which the outrigger wheels, when extended, engage the roadway with an upwardly yieldable pressure. This permits the vehicle to "lean" laterally in a normal manner when negotiating turns.

Still another object is the provision of a system of the character described wherein the means for extending the outrigger wheels may be closely adjusted and pre-set to provide the proper pressure thereof against the roadway, and is in no way affected by or dependent on the means used for retracting said wheels whenever dictated or desired. In other words, possible variations in operation of the retraction system cannot affect the road pressure of the outrigger wheels.

A still further object is the provision of a system of the character described having a control system providing selectively up to three modes of operation, a first mode in which the outrigger wheels are automatically extended at all speeds below a predetermined level, which may be pre-set as desired, and automatically retracted at all speeds in excess of that pre-set level, a second mode, especially for inexperienced riders, or on slick roadways, in which said wheels remain extended at all times, and a third mode, especially for experienced riders, in which said wheels are retracted at all speeds, although they are automatically extended whenever the cycle is parked and its engine turned off, thereby eliminating any necessity for a "kick stand" or other means for maintaining the vehicle upright when left unattended.

Other objects are simplicity and economy of construction, and efficiency and dependability of operation.

Figure 4:
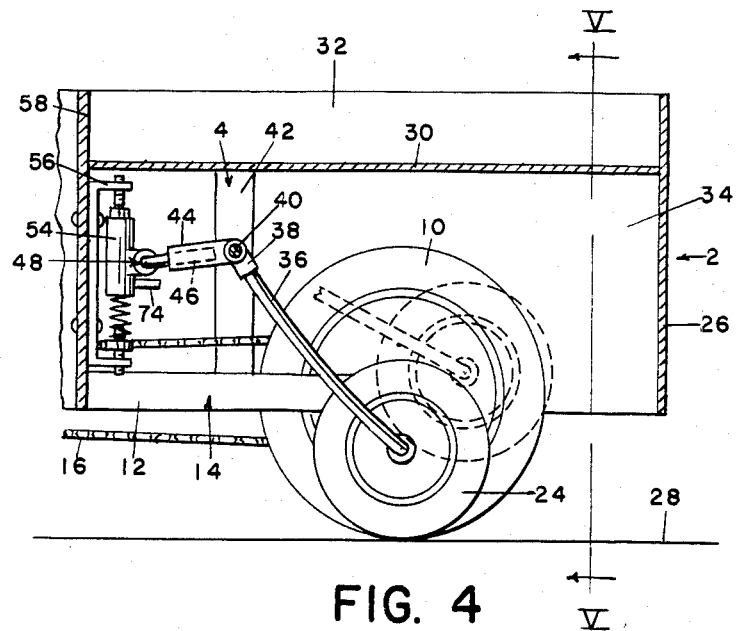
Figure 5:
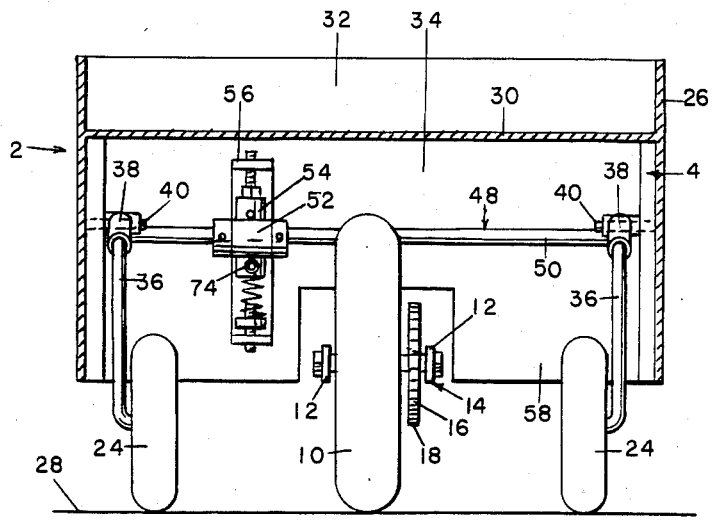
Figure 6:
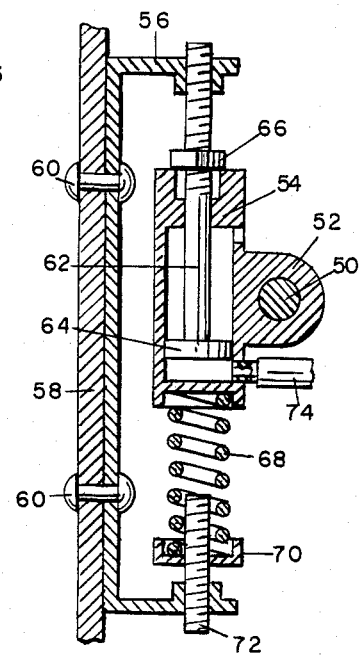
Figure 7:
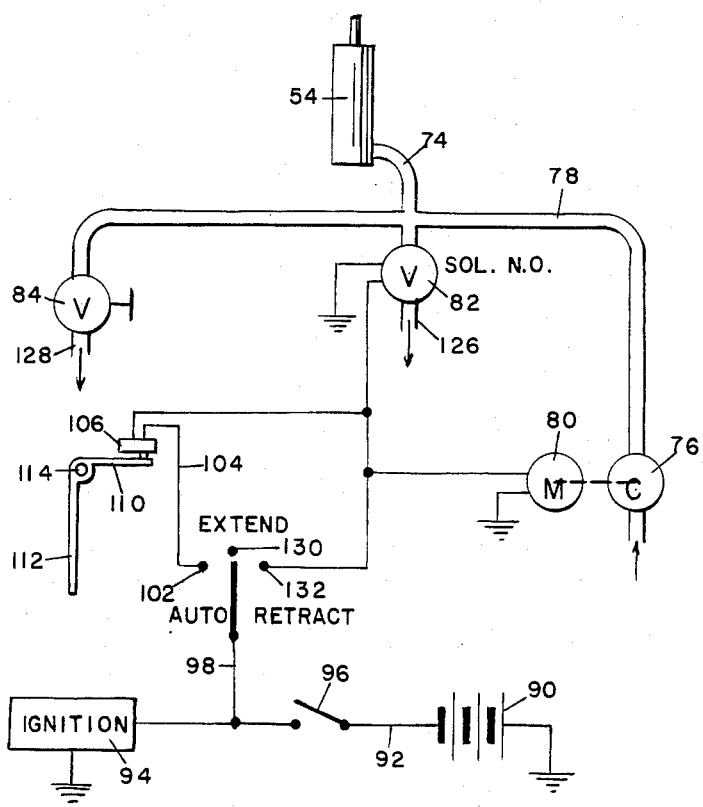
Figure 8:
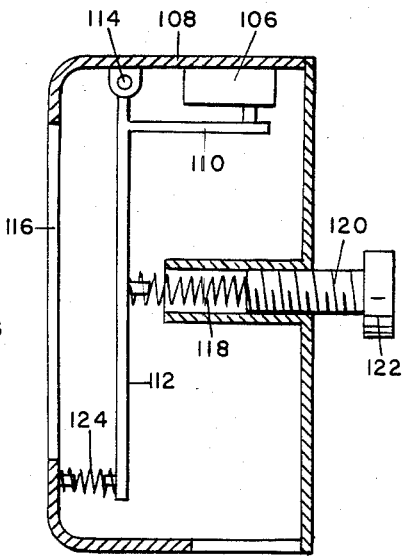

With these objects in view, as well as other objects which will appear in the course of the specification, reference will be had to the accompanying drawing, wherein:

FIG. 1 is a side elevational view of a motorcycle embodying the present invention, FIG. 2 is a top plan view thereof, FIG. 3 is a fragmentary sectional view taken on line III—III of FIG. 1, FIG. 4 is a sectional view taken on line IV—IV of FIG. 3, FIG. 5 is a sectional view taken on line V—V of FIG. 4, FIG. 6 is an enlarged fragmentary sectional view taken on line VI—VI of FIG. 3, FIG. 7 is a schematic diagram of the control system for the outrigger wheels, and FIG. 8 is a vertical sectional view of a physical embodiment of the speed-responsive switch of the system.

Like reference numerals apply to similar parts throughout the several views, and the numeral 2 applies generally to a motorcycle embodying the present invention. Said motorcycle includes a frame 4 supported at its forward end by a front wheel 6 which is steerable by means of handlebars 8, and at its rearward end by a rear drive wheel 10. The front and rear wheels are rotatable on horizontal transverse axes, and are disposed in the same vertical plane, this "inline" arrangement being standard in motorcycles. The rear wheel may be mounted rotatably between the arms 12 of a fork 14 connected to the vehicle frame and extending rearwardly to said wheel, and driven by a sprocket chain 16 engaging a sprocket wheel 18 mounted concentrically with the wheel for rotation therewith. The sprocket chain may be driven by a sprocket wheel 20 (see FIG. 1) which is in turn driven by the cycle engine, not shown but disposed beneath the seat 22 of the vehicle. However, it will be understood that the structure thus far described is standard in most motorcycles, and is not here shown in detail, as it is not deemed to be pertinent to the present invention.

According to the present invention, a pair of outrigger wheels 24 are disposed at respectively opposite sides of drive wheel 10, in outwardly spaced relation therefrom, at such distances from said drive wheel that when they are urged against the roadway with sufficient force, they will reliably stabilize the vehicle against lateral overturning. The vehicle frame also carries a body portion 26 which extends rearwardly around wheels 10 and 24, extending vertically from a point above the pavement level 28 to a point well above the wheels. Internally it is divided by a horizontal wall 30, constituting the space above said wall as luggage space 32, and the space below said wall as a wheel well 34.

Each outrigger wheel 24 is rotatably mounted for rotation on a horizontal transverse axis, at the lower end of a spring arm 36. Said spring arm then extends forwardly and upwardly, and is fixed at its upper end in an angled fitting 38 which is mounted for pivotal movement on a horizontal transverse axis by means of a pivot pin 40 fixed in a frame element 42 disposed inside of the wheel well at the adjacent side thereof. The forwardly extending legs 44 of the two fittings 38 are tubular, and the rearwardly extending legs 46 of a substantially rigid U-shaped crank 48 are inserted respectively into fitting legs 44 for telescoping sliding movement therein. The connecting bar 50 of said crank, between legs 46 thereof extends horizontally and transversely within the forward portion of the wheel well. Intermediate its ends connecting bar 50 is journalled rotatably in a bearing 52 which is affixed to or integral with a vertical cylinder 54.

As best shown in FIG. 6, fluid cylinder 54 is carried by a C-shaped bracket 56 fixed to a vertical wall 58, which is an element of the vehicle frame, as by rivets 60. Said cylinder is vertically movable on the piston rod 62 of its piston 64, said piston rod extending upwardly from the cylinder and being fixed in the upper leg of bracket 56. Upward movement of the cylinder is adjustably limited by a nut 66 threaded on the piston rod above the cylinder. Downward movement of the cylinder is resisted by a heavy spring 68 compressed between the lower end of the cylinder and a retainer cup 70 adjustably threaded on a screw 72 which is coaxial with the piston rod and fixed in the lower leg of bracket 56. The cylinder may be either air-operated, or hydraulic, receiving its operating fluid through a flexible hose 74.

Thus it will be seen that in operation spring 68 normally biases cylinder 54 upwardly, whereby crank 48 operates through fittings 38 and spring arms 36 to press outrigger wheels 24 downwardly against roadway 28, with enough pressure to flex the spring arms, as shown in solid lines in FIG. 4. This is the extended position of the outrigger wheels. However, when fluid is introduced into the cylinder under sufficient pressure to lower said cylinder against the bias of spring 68, it operates through crank 48 and spring arms 36 to first relieve the flexure of the spring arms and then to elevate wheels 24 well above roadway level as shown in dotted lines in FIG. 4. This is the retracted position of the outrigger wheels.

The extended position of the outrigger wheels may be properly adjusted by first locking nut 66 well above the cylinder, then with no fluid pressure in the cylinder, advancing retainer cup 70 upwardly along screw 72 to compress spring 68 and raise the cylinder until wheels 24 are pressed against the roadway with the desired flexure of their spring arms 36, and finally turning nut 66 until it engages the top of the cylinder snugly. After nut 66 has been set, retainer cup 70 may be further advanced upwardly to add to the tension of spring 68, in order to further brace the cylinder against being lowered by increased flexure force of spring arms 36, and to render the wheel extension action more positive, as will appear. Thus whenever the outrigger wheels are thereafter extended by relieving fluid pressure in the cylinder, the cylinder will always be elevated to the same point by spring 68, to apply the desired ground pressure to wheels 24. The road pressure of these wheels should be sufficient that they are capable of reliably stabilizing the vehicle against lateral overturning, but not so great as to tend to lift drive wheel 10 free of the roadway, or to materially reduce its traction. The yieldability of spring arms 36 has at least two important functions. First, by their resilience, independently of each other and of spring 68, they are both maintained in contact with the roadway at all times, despite lateral variations or unevenness of said roadway. This provides a smoother ride whenever the outrigger wheels are extended. Second, it permits the vehicle to "lean" laterally into turns, as is of course normal with two-wheeled vehicles. If the tension of spring 68 has been properly set as described, it will not yield and allow the cylinder to move downwardly from nut 66 in response to any flexure force of spring arms 36 which can occur while the wheels are extended. In connection with the accomodation of the spring arms to lateral tilting of the vehicle, it will be seen that while the road pressure of the outrigger wheel at the inside of the turn will of course increase due to the added flexure of its spring arm 36, the total weight supported by the outrigger wheels will not materially increase, since the road pressure of the wheel at the outside of the turn will be correspondingly reduced, so that the traction of drive wheel 10 will be maintained. It is of considerable importance that the wheel extension system, rather than the wheel retraction system, constitutes the described spring mechanism rather than the fluid pressure system. The spring mechanism is highly reliable and capable of fine adjustment, as described, and will insure proper extension of the wheels under virtually all conditions except the accidental retention of fluid pressure in the system, for which special provision is made as appears hereinbelow. The fluid system, on the other hand, necessarily contains many more components subject to possible malfunctions, and is hence less reliable. Any malfunction or non-function of its components could result in non-extension or over-extension of the wheels, either of which could produce disastrous results, if it were relied on for this purpose.

Cylinder 54 is powered and controlled by a system diagrammed in FIG. 7. It is supplied with pressurized fluid from an air compressor 76 (or hydraulic pump in a hydraulic system) through a conduit 78. The compressor is driven by an electric motor 80. Conduit 78 is provided with two vent valves, one a normally open, electrically operated valve 82, such as a solenoid valve, operable to be closed whenever its operating electric circuit is completed, and one a manually operable valve 84 preferably mounted on a control panel 86 mounted on a portion of the frame, such as steering column 88, so as to be easily accessible to the driver. The electrical system includes the usual vehicle battery 90 which is connected by wire 92 to the ignition system 94, and all other electrical components of the vehicle, through a key-operated ignition switch 96. Downstream from the ignition switch, so as to be controlled thereby, a wire 98 is connected to wire 92, and to the switch arm of a manually operable three-position selector switch 100. When switch 100 is closed on a first contact 102, it completes a circuit through a wire 104 to a normally open speed-responsive switch 106. Switch 106 may be a micro-switch carried in a housing 108 (see FIG. 8) mounted on the forward side of instrument panel 86, and is closed by the arm 110 of a wind vane 112 pivotally suspended in housing 108 at 114, responsively to wind generated by forward motion of the vehicle, and entering the housing through an open grill 116 at the housing front. Resistance to wind movement of vane 112 is supplied by a spring 118, the tension of which may be varied by turning a screw 120 threaded in the housing, and controlled by an exposed adjusting knob 122 easily accessible to the driver A smaller spring 124 counterbalances spring 128 and prevents fluttering of the vane. Thus the vehicle speed at which switch 106 will close may be closely regulated. Closure of switch 106 completes the operating circuits of motor 80 and solenoid valve 82, thereby actuating the motor and closing the valve. Manual valve 84 is normally always closed. Therefore, whenever the ignition switch 96 is closed and the vehicle started in movement, outrigger wheels 24 remain extended by the action of spring 68, since switch 106 is open and compressor motor 80 is not started, and valve 82 remains open to bleed off any pressure in the fluid system to atmosphere at 126 (or to a fluid reservoir in a hydraulic system). This condition is intended for low speed or stop-and-go driving when the possibility of overturning is always present, or when carrying an inexperienced passenger who may panic in emergencies. Seat 22 is of the stradle type, and is capable of accomodating both the driver and a passenger seated behind him. However, when the cycle attains the speed at which switch 106 has been pre-set to close, say for example 35 mph, the danger of overturning is greatly reduced, and the outrigger wheels may safely be retracted. Closure of switch 106 closes valve 82 to seal the fluid system, and actuates motor 80 of compressor 76 to supply pressurized fluid to cylinder 54, lowering it against the pressure of spring 68 to retract the wheels. Whenever the vehicle speed drops sufficiently to allow switch 106 to open, compressor 76 is deactuated, and valve 82 opens to vent the fluid system, so that the wheels 24 are again extended by spring 68. If for any reason any component of the electrical or fluid system should malfunction in a manner causing retention of fluid pressure in the cylinder, such as the failure of switch 106 to open at low vehicle speeds, or the sticking of solenoid valve 82 in a closed position, wheels 24 would not be extended by spring 68 as necessary, and an emergency could result. In these circumstances, the driver opens valve 84 manually. This bleeds the fluid to atmosphere at 128 (or to a fluid reservoir in a hydraulic system), relieving the cylinder pressure and allowing spring 68 to extend the wheels despite any other malfunction.

If the switch arm of selector switch 100 is set on contact 130, the outrigger wheels remain extended at all times and at all speeds, since contact 130 is blind, so that vent valve 82 is always open, and compressor 76 is never actuated. This made of operation may be desired when an inexperienced passenger may be too nervous or apprehensive to risk riding on only two wheels, or when the roadway surface is wet or icy, where the danger of overturning is always present to an increased degree.

When selector switch 100 is set on its third contact 132, the outrigger wheels are retracted at all times and at all speeds, so long as ignition switch 96 is closed, since this contact supplies actuating current directly to the compressor, and closing current to valve 82, without the intermediacy of speed-responsive switch 106. This type of operation may be desired by experienced riders who feel no need for the outrigger wheels, or where safety considerations do not indicate their use. However, even in this operational mode, the outrigger wheels are still automatically extended whenever the vehicle is stopped and ignition switch 96 opened, whereby to support the vehicle against overturning when it is left unattended, and eliminating any necessity for a kick stand or other supporting means. Moreover, since the wheel extension is mechanical by means of spring 68, this use of the wheels does not entail any drain on the vehicle battery.

While I have shown and described a specific embodiment of my invention, it will be readily apparent that many minor changes of structure and operation could be made without departing from the spirit of the invention.

What I claim as new and desire to protect by Letters Patent is:

1. A system for stabilizing a two-wheeled self-propelled motorcycle vehicle against lateral overturning, said vehicle having a steerable front wheel and a powered rear drive wheel normally disposed in the same vertical plane, said stabilizing system comprising:
   a. a pair of outrigger wheels carried by the vehicle frame for vertical movement relative thereto and disposed respectively at opposite sides of said drive wheel in laterally outwardly spaced relation therefrom,
   b. wheel extension means operable to move said outrigger wheels downwardly into engagement with the roadway surface when their use is desired, said wheel extension means comprising spring means biasing said outrigger wheels to their extended position, and
   c. wheel retraction means powered by the vehicle drive system and operable when actuated to overcome and reverse the bias movement of said spring means, whereby to retract said outrigger wheels upwardly, said wheel retraction means constituting a fluid pressure system powered by the vehicle power plant and operable when actuated to overcome the bias of said spring means to retract said wheels, said fluid pressure system comprising a compressor operable when driven to deliver fluid under pressure to retract said wheels, an electric motor operable to drive said compressor and powered by the vehicle electrical system, an operating electrical circuit for said motor, and means operable to complete said motor circuit whenever retraction of said wheels is desired.

2. A system as recited in claim 1 with the addition of a normally open, electrically operated valve venting the fluid pressure of said compressor, said valve being connected in the operating circuit of said motor whereby to be closed whenever said motor is actuated, said vent valve preventing possible pressure build-up in the system, which could cause unwanted retraction of the wheels, and insuring rapid extension of the wheels whenever the motor is deactivated.

3. A system as recited in claim 2 with the addition of a second manually operable vent valve operable when open to vent the fluid pressure of said compressor, said second valve normally being closed, but being capable of being opened manually to insure rapid extension of the wheels, in the event said first vent valve should fail to open on interruption of said circuit.

4. A system as recited in claim 1 with the addition of a speed-responsive switch included in said circuit in series with said motor, said speed-responsive switch being operable to close responsively to the speed of the vehicle at or above any pre-set speed, whereby the outrigger wheels are retracted, and to open at any speed below said pre-set speed, whereby the outrigger wheels are extended.

5. A system as recited in claim 4 with the addition of a manually operated, two-position selector switch connected in series in said motor circuit, said switch being operable in one position to complete said circuit through said speed-responsive switch, and in its second position to interupt said circuit completely, whereby said outrigger wheels remain extended at all times and at all speeds.

6. A system as recited in claim 5 wherein said selector switch is provided with a third position, in which it completes said motor circuit in by-passing relation to said speed-responsive switch, whereby said outrigger wheels are retracted at all speeds.

7. A system as recited in claim 6 wherein said motor circuit also includes the usual vehicle ignition switch in series therein, whereby when the selector switch is in said third position, and the vehicle is parked with the ignition switch open, said motor is deactivated and the outrigger wheels are extended to serve as a parking stand for the vehicle.

* * * * *